US008752895B2

(12) United States Patent
Fritz et al.

(10) Patent No.: US 8,752,895 B2
(45) Date of Patent: *Jun. 17, 2014

(54) CHILD RESTRAINT FOR VEHICLE

(71) Applicant: Cosco Management, Inc., Wilmington, DE (US)

(72) Inventors: Ward A. Fritz, Westwood, MA (US); Andrew W. Marsden, Hingham, MA (US); Walter S. Bezaniuk, Berkley, MA (US); Joseph D. Langley, Foxboro, MA (US); Eric Hyman, South Grafton, MA (US)

(73) Assignee: Cosco Management, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/957,178

(22) Filed: Aug. 1, 2013

(65) Prior Publication Data

US 2013/0313873 A1 Nov. 28, 2013

Related U.S. Application Data

(63) Continuation of application No. 13/101,006, filed on May 4, 2011, now Pat. No. 8,517,467.

(51) Int. Cl.
*A62B 35/00* (2006.01)
*B60N 2/26* (2006.01)
*B60R 22/10* (2006.01)
*A47D 15/00* (2006.01)

(52) U.S. Cl.
USPC ............... 297/250.1; 297/256.1; 297/467; 297/484

(58) Field of Classification Search
USPC .............. 297/250.1, 251, 252, 253, 254, 255, 297/256, 256.1, 256.11, 256.12, 256.13, 297/256.14, 256.15, 256.16, 467, 484
See application file for complete search history.

(56) References Cited

U.S. PATENT DOCUMENTS

| | | | | |
|---|---|---|---|---|
| 5,031,962 A | * | 7/1991 | Lee | 297/484 |
| 5,074,588 A | * | 12/1991 | Huspen | 297/484 X |
| 6,336,682 B1 | * | 1/2002 | Rosko | 297/250.1 X |
| 6,471,298 B2 | * | 10/2002 | Carine et al. | 297/484 X |
| 6,481,794 B1 | * | 11/2002 | Kassai et al. | 297/250.1 |
| 6,588,849 B2 | * | 7/2003 | Glover et al. | 297/467 |
| 6,659,564 B2 | * | 12/2003 | Kassai et al. | 297/484 |
| 6,779,843 B2 | * | 8/2004 | Kain | 297/250.1 |
| 7,350,862 B2 | * | 4/2008 | Fransen et al. | 297/250.1 |
| 7,445,286 B2 | * | 11/2008 | Siewertsen et al. | 297/250.1 |
| 7,469,965 B2 | * | 12/2008 | Glover et al. | 297/250.1 |
| 7,506,929 B2 | * | 3/2009 | Fransen et al. | 297/250.1 |
| 8,038,214 B2 | * | 10/2011 | Brandl et al. | 297/250.1 |
| 8,342,604 B2 | * | 1/2013 | Heisey et al. | 297/256.1 |
| 8,517,467 B2 | * | 8/2013 | Fritz et al. | 297/250.1 |
| 2002/0070593 A1 | * | 6/2002 | Takayama | 297/250.1 |
| 2006/0220427 A1 | * | 10/2006 | Patrizi et al. | 297/250.1 |

(Continued)

FOREIGN PATENT DOCUMENTS

NL 1011428 C2 9/2000

*Primary Examiner* — Rodney B White
(74) *Attorney, Agent, or Firm* — Barnes & Thornburg LLP

(57) ABSTRACT

A child restraint includes a juvenile seat and a child-restraint harness coupled to the juvenile seat. The juvenile seat includes a seat bottom and a seat back extending upwardly from the seat bottom. The juvenile seat also includes a headrest mounted for up-and-down movement on the seat back relative to the seat bottom.

20 Claims, 8 Drawing Sheets

(56) References Cited

U.S. PATENT DOCUMENTS

| | | | |
|---|---|---|---|
| 2008/0054691 A1* | 3/2008 | Glover | 297/250.1 |
| 2010/0007186 A1* | 1/2010 | Strong et al. | 297/250.1 |
| 2010/0140997 A1* | 6/2010 | Biaud et al. | 297/250.1 |
| 2010/0201170 A1* | 8/2010 | Brandl et al. | 297/250.1 |
| 2010/0264706 A1* | 10/2010 | Vogt et al. | 297/250.1 |
| 2013/0099536 A1* | 4/2013 | Mason et al. | 297/256.15 |

* cited by examiner

CHILD RESTRAINT FOR VEHICLE

This application is a continuation of application Ser. No. 13/101,006, filed May 4, 2011 now U.S. Pat. No. 8,517,467, which is expressly incorporated by reference herein.

BACKGROUND

The present disclosure relates to child restraints, and particularly to child restraints for use on passenger seats in vehicles. More particularly, the present disclosure relates to a child restraint including a base held in place on an underlying passenger seat by an anchor belt coupled to the vehicle and a juvenile seat coupled to the base.

SUMMARY

According to the present disclosure, a child restraint includes a juvenile seat and a child-restraint harness coupled to the juvenile seat. The juvenile seat includes a seat bottom and a seat back extending upwardly from the seat bottom. The child-restraint harness includes a shoulder belt coupled to the seat back and a crotch belt coupled to the seat bottom.

In illustrative embodiments, the seat bottom includes a seat pan adapted to support an occupant sitting on the juvenile seat and a seat skirt coupled to the seat pan to raise the seat pan. The seat pan includes a rearward edge located adjacent to the seat back and an opposite forward edge located away from the seat back. The seat pan is also formed to include an elongated crotch-belt slot arranged to extend in a forward direction away from the rearward edge and the seat back toward the forward edge of the seat pan.

In illustrative embodiments, the child restraint further includes a crotch-belt controller located under the seat pan in a controller space formed in the seat bottom. The crotch-belt controller is configured to provide position-variation means for allowing movement of the crotch belt in the crotch-belt slot toward and away from the seat back between a first position adapted for use with a relatively small child and located a first distance from the seat back and a second position adapted for use by a relatively larger child and located a relatively larger second distance from the seat back and for anchoring the crotch belt in one of the first and the second positions at the option of the caregiver so that spacing between the crotch belt and the seat back is matched to the size of the child seated on the seat pan.

In illustrative embodiments, the crotch-belt controller includes a connecting rod coupled to the crotch belt to move therewith and a controller foundation formed to include a downwardly opening first rod-receiving notch and a downwardly opening second rod-receiving notch. The connecting rod is positioned to lie in the first rod-receiving notch when the connecting rod is in the first position. The first rod-receiving notch is defined in part by a first inner side wall included in the controller foundation and the first inner side wall cooperates with a seat-back reference line associated with the seat back to define the first distance. The connecting rod is positioned to lie in the downwardly opening second rod-receiving notch when the connecting rod is in the second position. The second rod-receiving notch is defined in part by a second inner side wall included in the controller foundation and the second inner side wall cooperates with the seat-back reference line to define the relatively larger second distance.

According to the present disclosure, a child restraint includes a juvenile seat and a child-restraint harness coupled to the juvenile seat. The juvenile seat includes a seat bottom, a seat back extending upwardly from the seat bottom, and a movable headrest mounted on the seat back for up-and-down movement relative to the seat back. The child-restraint harness includes a shoulder belt coupled to the seat back and a crotch belt coupled to the seat bottom.

In illustrative embodiments, the child restraint further includes means for coordinating movement of the crotch belt with the movement of the movable headrest. The means for coordinating movement causes the crotch belt to be moved to a predetermined position relative to the seat bottom in response to movement of the movable headrest. As a result, movement of an occupant sitting on the juvenile seat and restrained by the child-restraint harness is minimized during application of an external force to the juvenile seat and comfort of the occupant is maximized.

In illustrative embodiments, the means for coordinating includes an upper visual indicator and a lower visual indicator. The upper visual indicator is coupled to shoulder belt and arranged to be visible to a caregiver after movement of the movable headrest. The lower visual indicate is coupled to the crotch belt and is visible after the crotch belt has been moved to a position that causes the lower visual indicator to match the upper visual indicator.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 4 is a view similar to FIG. 2 showing the crotch belt in the first position nearest the seat back and suggesting that a downward force (single phantom arrow) is first applied to the crotch belt to cause the crotch belt and connecting rod to move downwardly out of the first rod-receiving notch so that the crotch belt may be moved forwardly in the crotch-belt slot as suggested in FIG. 5 and shown in FIG. 6;

FIG. 5 is a view similar to FIG. 4 showing the crotch belt and the connecting rod after the downward force (solid single arrow) has been applied to cause the connecting rod to move out of the first rod-receiving notch so that forward movement of the crotch belt and connecting rod may occur;

FIG. 6 is a view similar to FIG. 5 showing the crotch belt during movement forward toward the fourth rod-receiving slot and prior to upward movement into the fourth rod-receiving slot as suggested in FIG. 7;

FIG. 7 is a view similar to FIG. 6 showing the crotch belt in a fourth position furthest from the seat back;

DETAILED DESCRIPTION

Figure 1:
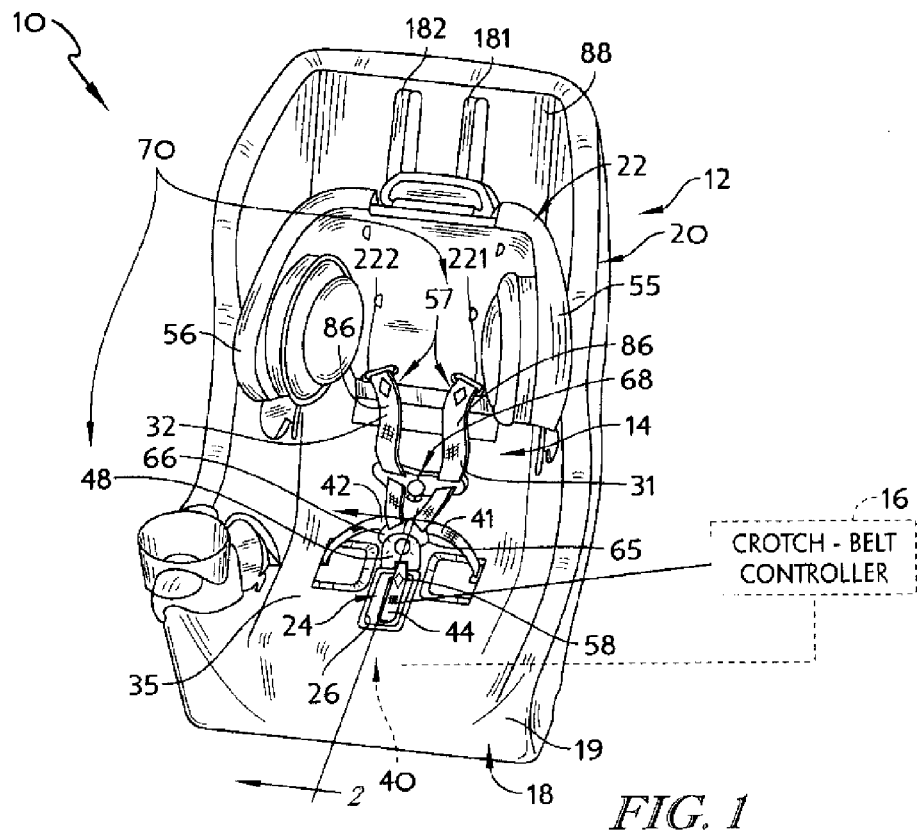
FIG. 1 is a perspective view of a child restraint in accordance with the present disclosure for use on a passenger seat in a vehicle, showing a juvenile seat including a seat bottom and a seat back and a child-restraint harness coupled to the seat bottom and seat back and configured to restrain a child sitting in the juvenile seat, and showing that a crotch belt included in the restraint harness is arranged to pass through an elongated crotch-belt slot and is coupled to the seat bottom by a crotch-belt controller included in the child restraint that is configured to anchor the crotch belt to the seat bottom as suggested in FIGS. 4-7.

A child restraint 10 in accordance with the present disclosure includes a juvenile seat 12, a child-restraint harness 14, and a crotch-belt controller 16 as shown, for example, in FIG. 1. Juvenile seat 12 includes a seat bottom 18, a seat back 20 extending upwardly from seat bottom 18, and a movable headrest 22 mounted for up-and-down movement on seat back 20 relative to seat bottom 18. Child restraint 10 can be configured to restrain movement of various sized children. Crotch-belt controller 16 is configured to provide position-variation means for allowing movement of crotch belt 24 in a crotch-belt slot 26 toward and away from seat back 20 while child-restraint harness 14 is configured to assume an inactive state between a first position that is adapted for use with a relatively small child and located a first distance D1 from seat back and a second position that is adapted for use by a relatively larger child and located a relatively larger second distance D2 from seat back 20 and for anchoring crotch belt 24 in one of the first and the second positions at the option of the caregiver before a shoulder-belt retainer 48 is coupled to crotch belt 24 is coupled to shoulder belts 31, 32 to establish an active state of child-restraint harness 14 so that spacing between crotch belt 24 and seat back 20 in the active state of child-restraint harness 14 is matched to the size of the child seated on seat bottom 18.

Figure 2:
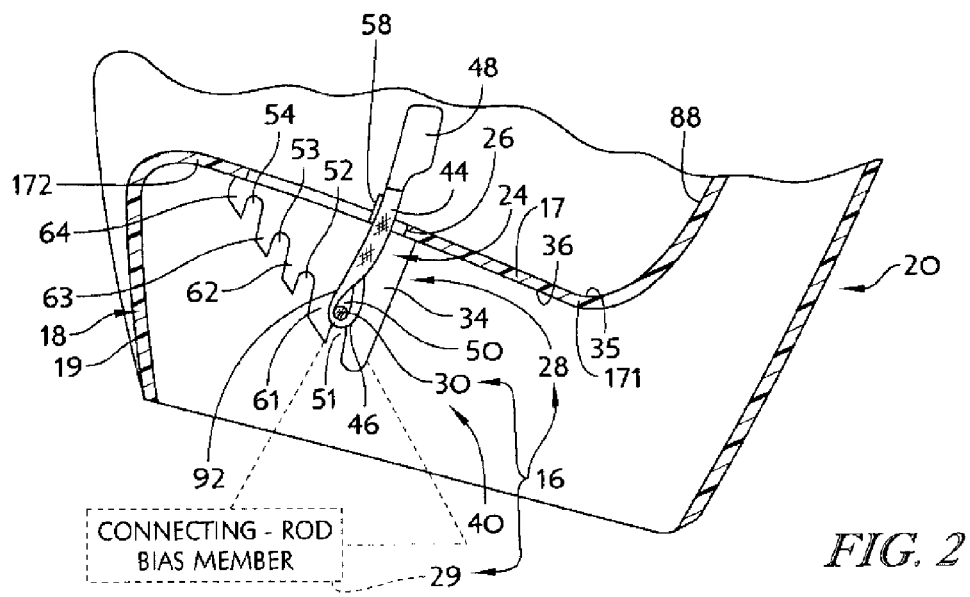
FIG. 2 is a sectional view taken along line 2-2 of FIG. 2 showing the upstanding crotch belt of FIG. 1 arranged in a first position in the crotch-belt slot nearest the seat back and showing that the crotch-belt controller includes a trapezoid-shaped controller foundation coupled to an inner surface of a seat pan included in the seat bottom and a connecting rod arranged to interconnect the crotch belt and the controller foundation.
Figure 3:
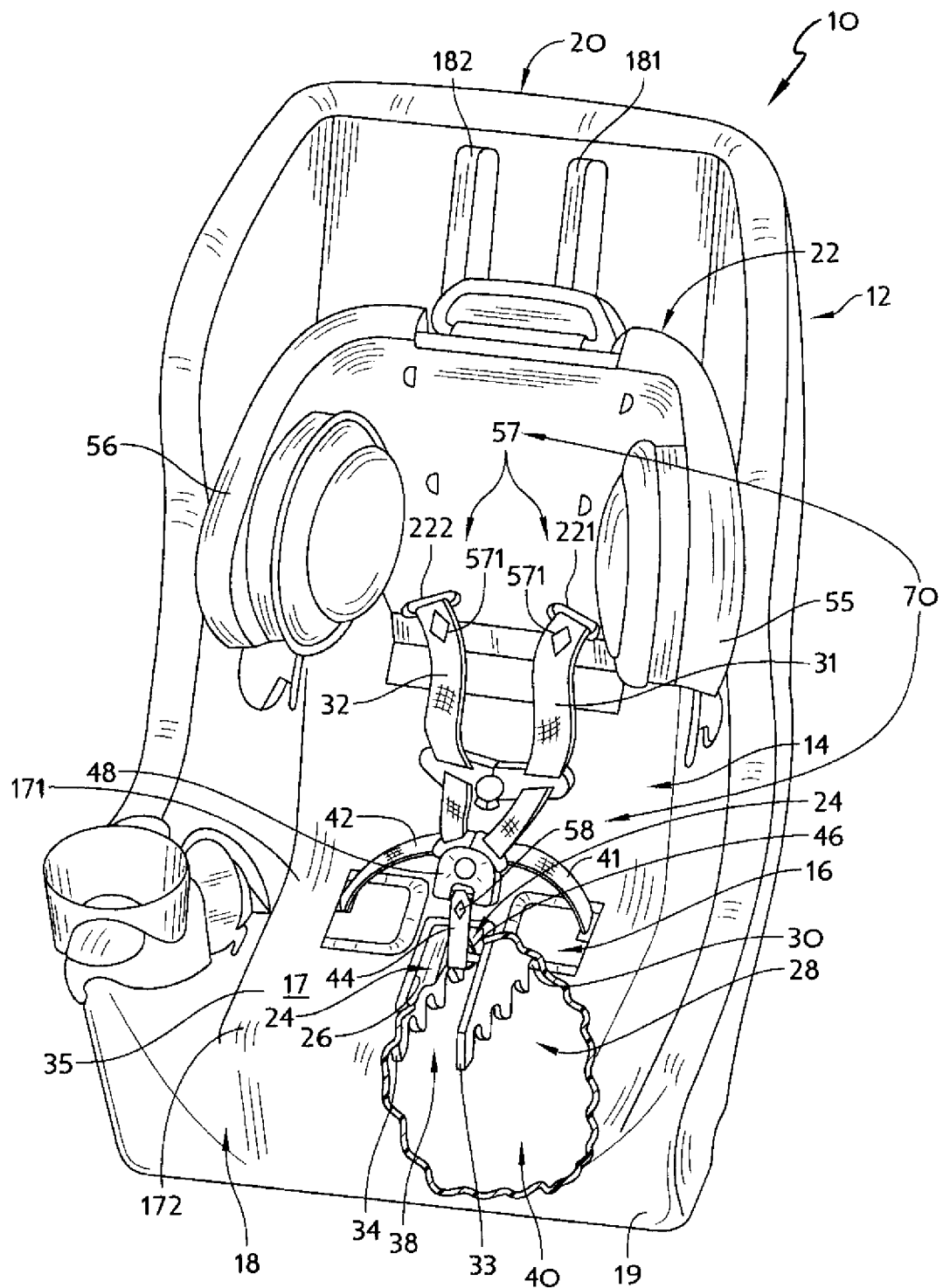
FIG. 3 is an enlarged perspective view of the child restraint of FIG. 1 with portions broken away to reveal first and second foundation flanges coupled to the inner surface of the seat pan and spaced apart from one another to locate the crotch belt therebetween and revealing that the connecting rod is positioned to lie in a first rod-receiving notch formed in each of the foundation flanges.

A child sitting on juvenile seat 12 is restrained on juvenile seat 12 by child-restraint harness 14 as suggested in FIG. 2. As an example, child-restraint harness 14 includes first and second shoulder belts 31, 32, first and second thigh-restraint belts 41, 42, and crotch belt 24. Shoulder belts 31, 32 are coupled to seat back 20 of juvenile seat 12 and routed through movable headrest 22 as shown in FIGS. 1 and 3. Movable headrest 22 is mounted on seat back 20 for up-and-down movement relative to seat bottom 18 so that occupants of various sizes may sit on juvenile seat 12. During movement of movable headrest 22, shoulder belts 31, 32 move therewith so that shoulder belts 31, 32 are at a height above seat bottom 18 that corresponds with the vertical position of movable headrest 22.

Crotch belt 24 is coupled to seat bottom 18 and is routed through crotch-belt slot 26 formed in seat bottom 18 as illustrated in FIGS. 1-3. Crotch-belt slot 26 is arranged to open into a controller space 40 formed in seat bottom 18. Crotch belt 24 is coupled to seat bottom 18 for back-and-forth movement in crotch-belt slot 26 relative to seat bottom 18 so that occupants of various sizes may be restrained while sitting on juvenile seat 12. As an example, crotch belt 24 is arranged to lie in a first position nearest seat back 20 when movable headrest 22 is in a lowered position nearest seat bottom 18. Crotch belt 24 is moved outwardly away from seat back 20 as movable headrest 22 is moved upwardly away from seat bottom 18 so that the position of crotch belt 24 cooperates with the position of movable headrest.

Seat bottom 18 includes a seat pan 17 and a seat skirt 19 appended to seat pan 17 as shown in FIGS. 1-3. Seat skirt 19 and seat pan 17 cooperate to define a controller space 40 in which crotch-belt controller 16 is positioned to lie in. Crotch-belt slot 26 is formed in seat pan 17 and arranged to open into controller space 40 as shown in FIG. 2. Crotch-belt slot 26 also extends a direction away from a rearward edge 171 of seat pan 17 and seat back 20 and toward a forward edge 172 of seat pan 17. Seat pan 17 further includes an outer surface 35 arranged to face in an upward direction and an opposite inner surface 36 that is arranged to face opposite outer surface 35.

Figure 9:
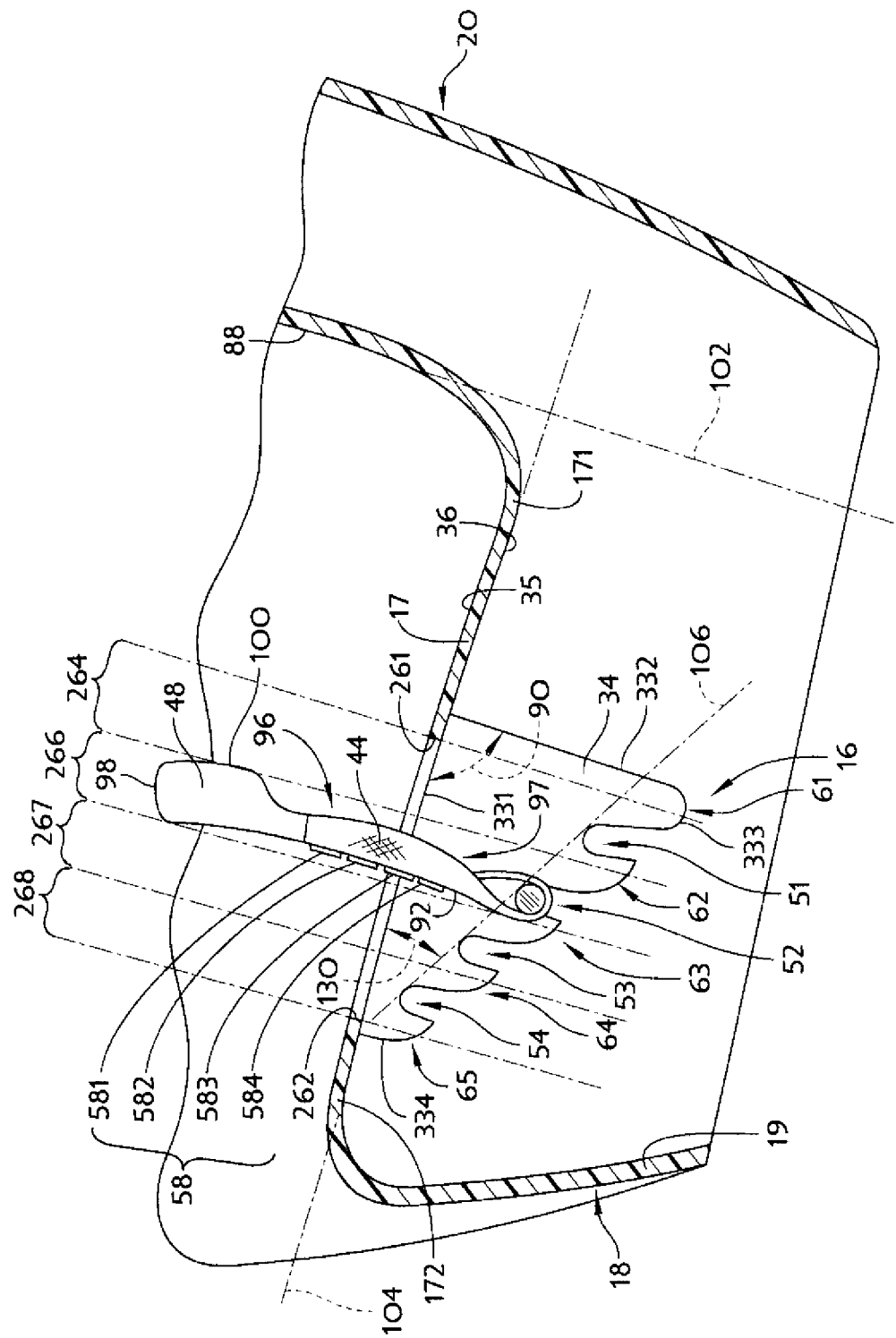
FIG. 9 is an enlarged partial elevation view of the child restraint of FIG. 8 suggesting that the crotch belt and connecting rod may anchored to the controller foundation in one of the first, second, third, and fourth positions.

Crotch-belt slot 26 is defined by an inner boundary edge 261 and an outer boundary edge 262 as shown in FIG. 9. Inner boundary edge 261 is positioned to lie between outer boundary edge 262 and seat back 20. As suggested in FIG. 9, crotch belt 24 extends through a first region 264 of crotch-belt slot 26 when crotch belt 24 is first distance D1 from seat back 20. First region 264 is positioned to lie between inner boundary edge 261 and outer boundary edge 262. Crotch belt 24 extends through a second region 266 when crotch belt 24 is second distance D2 from seat back 20. Second region 266 is positioned to lie between first region 264 and outer boundary edge 262 as shown in FIG. 3. Crotch-belt slot 26 is further divided into a third region 267 and a fourth region 268. Third region 267 lies between second region 266 and outer boundary edge 262. Fourth region 268 lies between third region 267 and outer boundary edge 262.

The ability to move crotch belt 24 and the ability to anchor crotch belt 24 is controlled by crotch-belt controller 16 as shown in FIGS. 2 and 4-7. As an illustrative example, crotch-belt controller 16 includes a controller foundation 28 and a connecting rod 30 as shown in FIG. 3. Controller foundation 28 is appended to inner surface 36 of seat pan 17. Connecting rod 30 is arranged to interconnect controller foundation 28 and crotch belt 24 and configured to move with crotch belt 24 as shown in FIGS. 4-7 and FIG. 8 when child-restraint harness 14 is in the inactive state.

Controller foundation 28 includes first and second foundation flanges 33, 34 as shown in FIG. 3. First foundation flange 33 is spaced apart from second foundation flange 34 to locate crotch-belt slot 26 therebetween. Crotch-belt slot 26 is configured to open into a crotch-belt space 38 defined between foundation flanges 33, 34. Crotch belt 24 is arranged to extend downwardly through crotch-belt slot 26 and into crotch-belt space 38 and lie between foundation flanges 33, 34. Crotch belt 24 couples to connecting rod 30 in crotch-belt space 38 as shown in FIG. 3.

First foundation flange 33 is substantially the same as second foundation flange 34, and thus, only first foundation flange 33 will be discussed in detail. First foundation flange 33 is formed to include downwardly opening first, second, third, and fourth rod-receiving notches 51, 52, 53, and 54 as shown in FIGS. 2 and 4-9A. Each rod-receiving notch 51, 52, 53, and 54 is arranged to open into controller space 40. Rod-receiving notches 51, 52, 53, 54 are spaced apart from one another by companion fingers 61, 62, 63, 64, and 65. Fingers 61, 62, 63, 64, 65 and rod-receiving notches 51, 52, 53, 54 cooperate to retain connecting rod 30 and crotch belt 24 in one of the first position, shown in FIGS. 1-3, 8, and 10, the second position suggested in FIG. 8, the third position suggested in FIG. 8, and the fourth position shown in FIG. 7 and suggested in FIG. 8.

As an illustrative example, first foundation flange 33 has a trapezoidal shape as shown in FIG. 9. The trapezoidal shape is defined by a first leg 331, a first base 332, a second leg 333, and a fourth base 334. First leg 331 is coupled to inner surface 36 of seat pan 17. First base 332 intersects first leg 331 at about a right angle 90. As a result, first base 332 extends away from inner surface 36 of seat pan 17. Second leg 333 intersects first base 332 to define an included acute angle 60 therebetween. Second base 334 is arranged to interconnect and extend between first and second legs 331, 333 as shown in FIG. 9. As an example, included acute angle 60 is about 60 degrees.

Figure 9A:
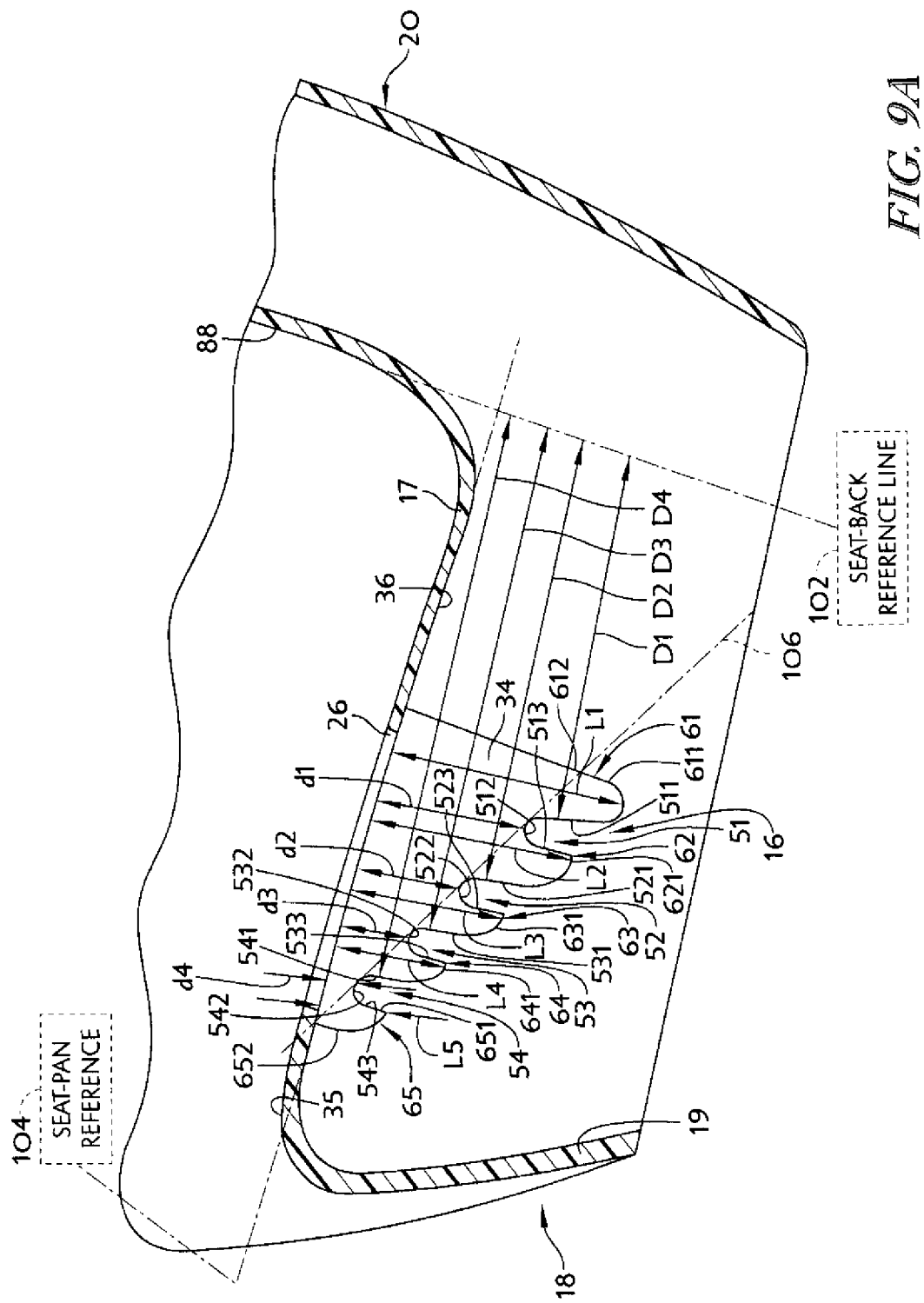
FIG. 9A is an enlarged view similar to FIG. 9 showing various dimensions used to locate the first, second, third, and fourth rod-receiving notches.

First rod-receiving notch 51 is defined by a first inner side wall 511, a first outer wall 513, and a first bottom wall 512 as shown in FIG. 9A. First inner side wall 511, second outer side wall 523, and first bottom wall 512 are included in each foundation flange 33, 34. First inner side wall 511 is spaced apart from first outer side wall 513 and first bottom wall 512 is arranged to lie between and interconnect first inner and outer side walls 511, 513 as shown in FIG. 9A. As an example, first bottom wall 512 has an inverted U shape which is configured to mate with connecting rod 30 when connecting rod 30 is in the first position and positioned to lie between first inner and outer walls 511, 513.

First inner side wall 511 cooperates with a seat-back reference line 102 to define first distance D1. First bottom wall 512 cooperates with a seat-pan reference line 104 to define a first depth d1. Together, the dimensions D1, d1 define a location of first rod-receiving notch 51, and as a result, the first position of connecting rod 30.

Second rod-receiving notch 52 is defined by a second inner side wall 521, a second outer side wall 523, and a second bottom wall 522 as shown in FIG. 9A. Second inner side wall 521, second outer side wall 523, and second bottom wall 522 are included in each foundation flange 33, 34. Second inner side wall 521 is spaced apart from second outer side wall 523 and second bottom wall 522 is arranged to lie between and interconnect second inner and outer side walls 521, 523 as shown in FIG. 9A. As an example, second bottom wall 522 has an inverted U shape which is configured to mate with connecting rod 30 when connecting rod 30 is in the second position and positioned to lie between second inner and outer walls 521, 523.

Second inner side wall 521 cooperates with seat-back reference line 102 to define second distance D2. Second bottom wall 522 cooperates with seat-pan reference line 104 to define a second depth d2. Together, the dimensions D2, d2 define a location of second rod-receiving notch 52, and as a result, the second position of connecting rod 30.

Third rod-receiving notch 53 is defined by a third inner side wall 531, a third outer side wall 533, and a third bottom wall 532 as shown in FIG. 9A. Third inner side wall 531, third outer side wall 533, and third bottom wall 532 are included in each foundation flange 33, 34. Third inner side wall 531 is spaced apart from third outer side wall 533 and third bottom wall 532 is arranged to lie between and interconnect third inner and outer side walls 531, 533 as shown in FIG. 9A. As an example, third bottom wall 532 has an inverted U shape which is configured to mate with connecting rod 30 when connecting rod 30 is in the third position and positioned to lie between third inner and outer side walls 531, 533.

Third inner side wall 531 cooperates with seat-back reference line 102 to define a third distance D3. Third bottom wall 532 cooperates with seat-pan reference line 104 to define a third depth d3. Together, the dimensions D3, d3 define a location of third rod-receiving notch 53, and as a result, the third position of connecting rod 30.

Fourth rod-receiving notch 54 is defined by a fourth inner side wall 541, a fourth outer side wall 543, and a fourth bottom wall 542 as shown in FIG. 9A. Fourth inner side wall 541, fourth outer side wall 543, and fourth bottom wall 542 are included in each foundation flange 33, 34. Fourth inner side wall 541 is spaced apart from fourth outer side wall 543 and fourth bottom wall 542 is arranged to lie between and interconnect fourth inner and outer side walls 541, 543 as shown in FIG. 9A. As an example, fourth bottom wall 542 has an inverted U shape which is configured to mate with connecting rod 30 when connecting rod 30 is in the fourth position and positioned to lie between fourth inner and outer side walls 541, 543.

Fourth inner side wall 541 cooperates with seat-back reference line 102 to define a fourth distance D4. Fourth bottom wall 542 cooperates with seat-pan reference line 104 to define a fourth depth d4. Together, the dimensions D4, d4 define a location of fourth rod-receiving notch 54, and as a result, the fourth position of connecting rod 30.

First and second rod-receiving notches 51, 52 cooperate to define a receiving-notch reference line 106 as shown in FIG. 9. Receiving-notch reference line 106 intersects seat-pan reference line 104 and defines an acute angle 130 therebetween as illustrated in FIG. 9. As an example, acute angle 130 is about 30 degrees. Rod-receiving notches 53, 54 also are aligned with and lie on receiving-notch reference line 106 as shown in FIG. 9.

Receiving-notch reference line 106 also represents a set of points which are defined by using distances D1, D2, D3, and D4 and depths d1, d2, d3, and d4. As a result, the location of connecting rod 30 may be determined by using the distance and depth dimensions. As shown below in the table, each position of connecting rod 30 is identified by the distance and the depth. As an example, a relationship between predetermined distances is D1<D2<D3<D4 and a relationship between predetermined depths is d1>d2>d3>d4.

| Position of Connecting Rod 30 | Distance | Depth |
| --- | --- | --- |
| First Position | D1 | d1 |
| Second Position | D2 | d2 |

-continued

| Position of Connecting Rod 30 | Distance | Depth |
|---|---|---|
| Third Position | D3 | d3 |
| Fourth Position | D4 | d4 |

When crotch belt 24 is in the first position, an upper edge 98 of shoulder-belt retainer 48, which is coupled to an outer portion 96 crotch belt 24, is positioned to lie a first height 71 above outer surface 35 of seat pan 17. An inward face 100 of shoulder-belt retainer 48 is positioned to lie a first belt-retainer distance 81 from seat back 20 as suggested in FIG. 8.

As a result of crotch belt 24 being in the first position, crotch belt 24 is nearest both seat bottom 18 and seat back 20. At the same time, movable headrest 22 is in a first headrest position that is a first headrest height H1 above outer surface 35 of seat pan 17. When crotch belt 24 is in the first position and movable headrest 22 is in the first headrest position, juvenile restraint is in a first configuration suitable for restraining a small child sitting on juvenile seat 12.

When crotch belt 24 is in the second position, upper edge 98 of shoulder-belt retainer 48 is positioned to lie a second height 72 above outer surface 35 of seat pan 17. Inward face 100 of shoulder-belt retainer 48 is positioned to lie a second belt-retainer distance 82 from seat back 20 as suggested in FIG. 8.

As an example, while crotch belt 24 is in the second position, movable headrest 22 is in a second headrest position that is a second headrest height H2 above outer surface 35 of seat pan 17. When crotch belt 24 is in the second position and movable headrest 22 is in the second headrest position, juvenile restraint is in a second configuration suitable for restraining a relatively larger child sitting on juvenile seat 12.

When crotch belt 24 is in the third position, upper edge 98 of shoulder-belt retainer 48 is positioned to lie a third height 73 above outer surface 35 of seat pan 17. Inward face 100 of shoulder-belt retainer 48 is positioned to lie a third belt-retainer distance 83 from seat back 20 as suggested in FIG. 8.

As an example, while crotch belt 24 is in the third position, movable headrest 22 is in a third headrest position that is a third headrest height H3 above outer surface 35 of seat pan 17. When crotch belt 24 is in the third position and movable headrest 22 is in the third headrest position, juvenile restraint is in a third configuration suitable for restraining an even larger child sitting on juvenile seat 12.

When crotch belt 24 is in the fourth position, upper edge 98 of shoulder-belt retainer 48 is positioned to lie a fourth height 74 above outer surface 35 of seat pan 17. Inward face 100 of shoulder-belt retainer 48 is positioned to lie a fourth belt-retainer distance 84 from seat back 20 as suggested in FIG. 8.

As an example, while crotch belt 24 is in the fourth position, movable headrest 22 is in a fourth headrest position that is a fourth headrest height H4 above outer surface 35 of seat pan 17. When crotch belt 24 is in the fourth position and movable headrest 22 is in the fourth headrest position, juvenile restraint is in a fourth configuration suitable for restraining still yet an even larger child.

Crotch-belt controller 16 further includes a connecting-rod bias member 29 as shown diagrammatically in FIG. 2. Connecting-rod bias member 29 is configured to provide means for biasing upwardly connecting rod 30 to cause connecting rod 30 and crotch belt 24 to remain in mating contact with rod-receiving notches 51, 52, 53, 54. As an example, connecting-rod bias member 29 is a spring coupled on each end of connecting rod 30 and to controller foundation 28. The springs are configured to provide an upwardly directed bias force to connecting rod 30.

Each foundation flange 33, 34 also includes first, second, third, fourth, fifth, and sixth fingers 61, 62, 63, 64, 65 and as shown in FIG. 9A. First rod-receiving notch 51 is positioned to lie between first and second fingers 61, 62. Second rod-receiving notch 52 is positioned to lie between second and third fingers 62, 63. Third rod-receiving notch 53 is positioned to lie between third and fourth fingers 63, 64. Fourth rod-receiving notch 54 is positioned to lie between fourth and fifth fingers 64, 65.

First finger 61 includes a first tip 611, an initial side wall 612, and first inner side wall 511. First tip 611 cooperates with seat-pan reference line 104 to define a first length L1 as shown in FIG. 9A.

Second finger 62 includes a second tip 621, first outer side wall 513, and second inner side wall 521. Second tip 621 cooperates with seat-pan reference line 104 to define a second length L2 as shown in FIG. 9A.

Third finger 63 includes a third tip 631, second outer side wall 523, and third inner side wall 531. Third tip 631 cooperates with seat-pan reference line 104 to define a third length L3 as shown in FIG. 9A.

Fourth finger 64 includes a fourth tip 641, third outer side wall 533, and fourth inner side wall 541. Fourth tip 641 cooperates with seat-pan reference line 104 to define a fourth length L4 as shown in FIG. 9A.

Fifth finger 65 includes a fifth tip 651, fourth outer side wall 543, and a last side wall 652. Fifth tip 651 cooperates with seat-pan reference line 104 to define a fifth length L5 as shown in FIG. 9A. As an example, first length L1 is greater than second length L2. Second length L2 is greater than third length L3. Third length L3 is greater than fourth length L4. Fourth length L4 is greater than fifth length L5.

Crotch belt 24 illustratively includes a web 44 and a loop 46 as shown in FIGS. 2 and 4-7. Web 44 includes a first end coupled to a shoulder-belt retainer 48 and an opposite second end coupled to loop 46 as shown in FIG. 2. Crotch belt 24 also includes means for rigidifying web 44 to cause web 44 to extend upwardly away from seat bottom 18 without being coupled to first and second shoulder belts 31, 32 and to cause connecting rod 30 to move with web 44 in response to application a downward force F to web 44 to move connecting rod 30 downwardly away from one of rod-receiving notches 51, 52, 53, and 54 so that a caregiver may reposition crotch belt 24 as desired as suggested in FIGS. 4-7.

Figure 4:
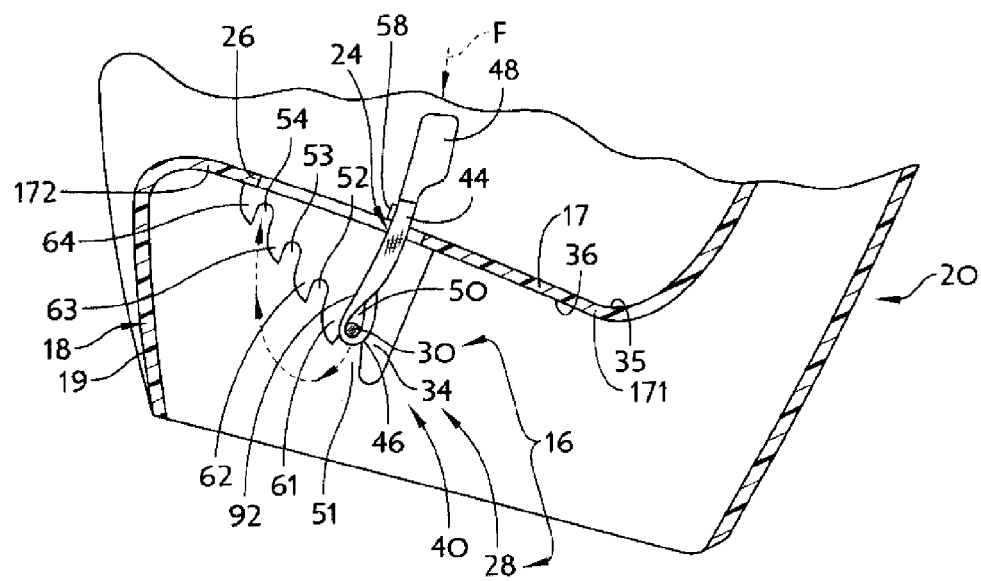
FIGS. 4-7 show a series of views illustrating movement of the crotch belt from the first position nearest the seat back to a fourth position farthest away from the seat back.
Figure 5:
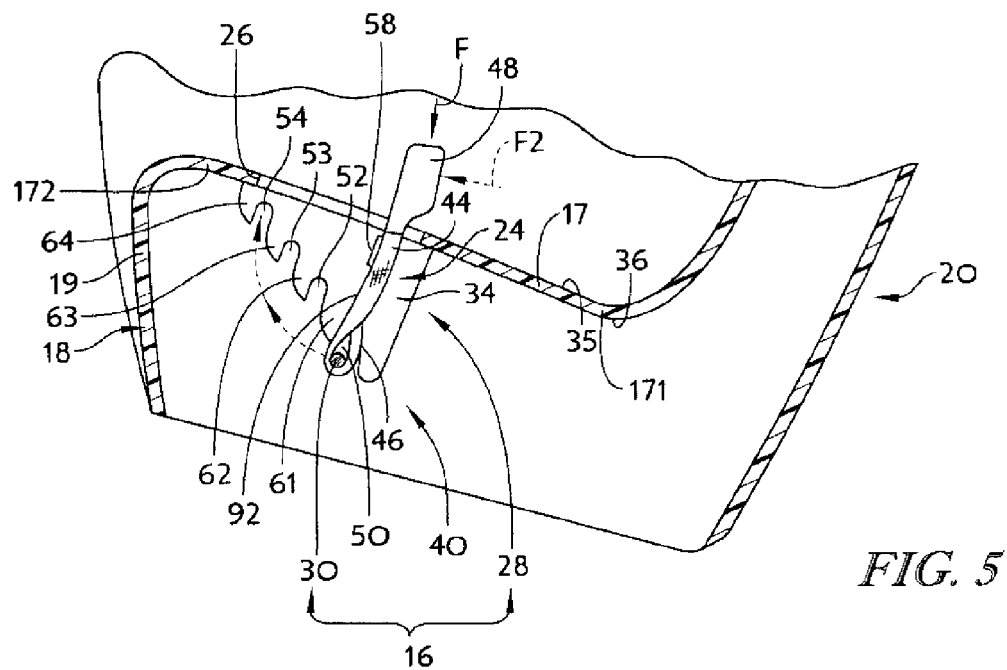
Figure 6:
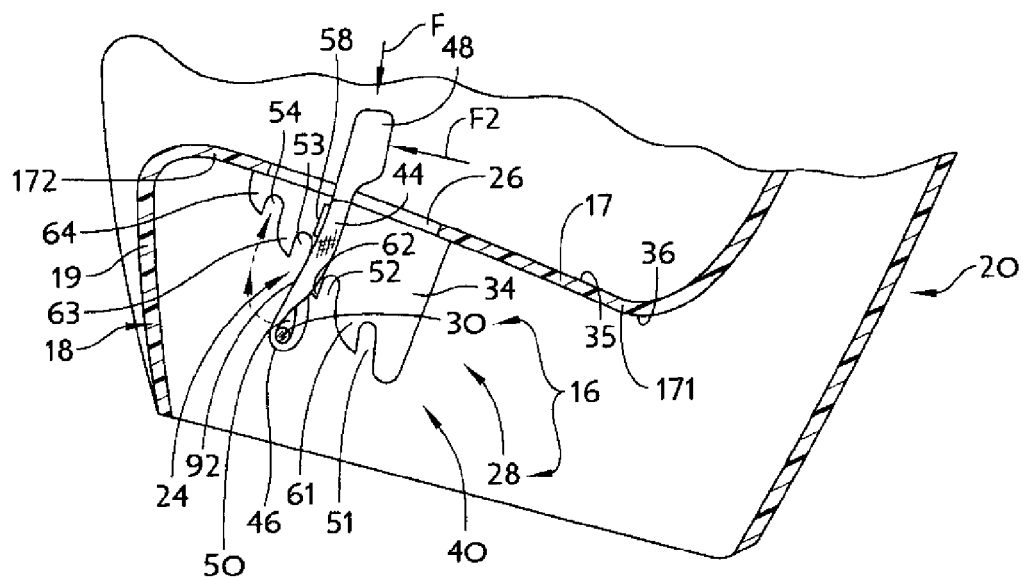
Figure 7:
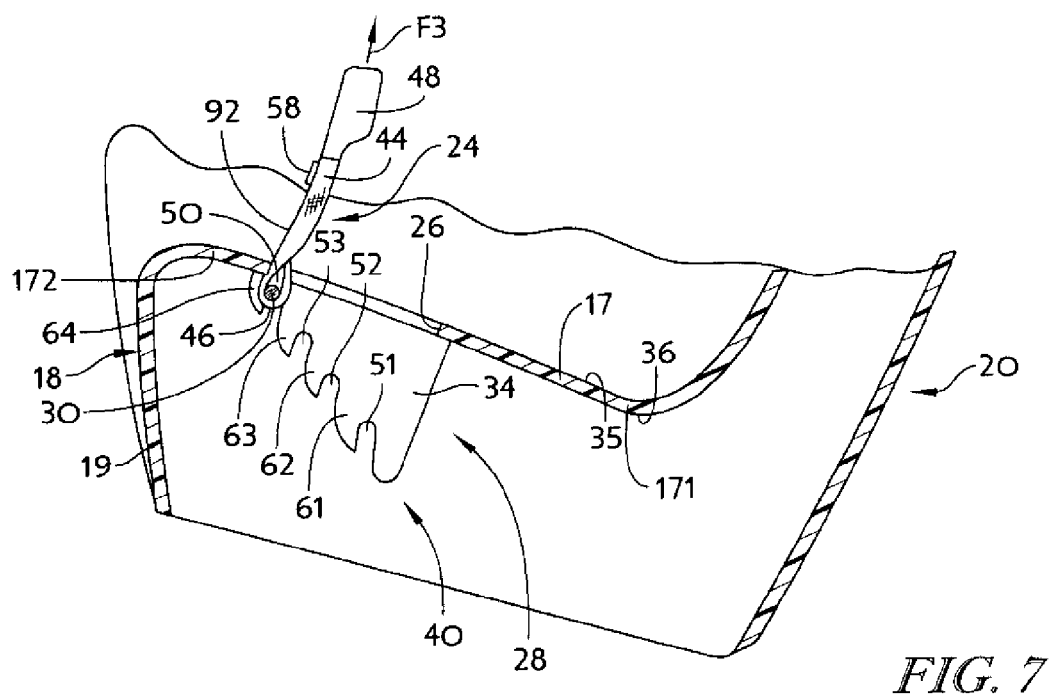
Figure 8:
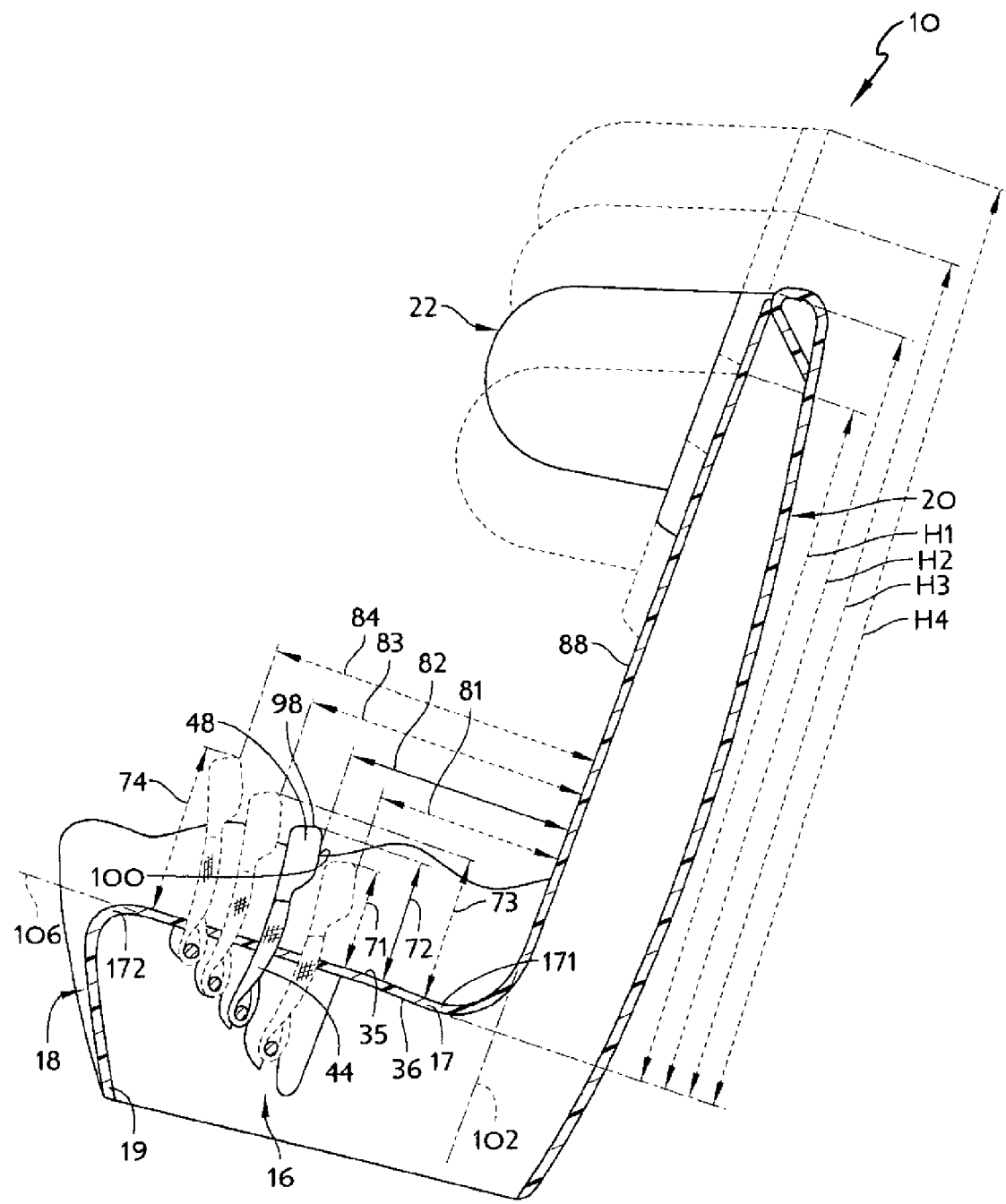
FIG. 8 is an elevation view of the child restraint of FIG. 1 with portions broken away suggesting various predetermined positions in which the crotch belt may be arranged and suggesting various position in which a movable headrest may be arranged in cooperation with movement of the crotch belt.

As an example of use, crotch belt 24 and connecting rod 30 begin in the first position nearest seat back 20 and seat bottom 18 as shown in FIG. 4. A caregiver applies downward force F to shoulder-belt retainer 48 thereby imparting downward force onto crotch belt 24 and connecting rod 30 to move crotch belt 24 and connecting rod 30 out of mating contact with first rod-receiving notch 51. Connecting rod 30 moves downward a distance so as to be below first tip 611 of first finger 61 as shown in FIG. 5. Once connecting rod 30 has moved past first tip 611 of first finger 61, caregiver then applies a forward force F2 while maintaining downward force F to shoulder-belt retainer 48 to cause connecting rod 30 and crotch belt 24 to move in a forward direction away from seat back 20 as shown in FIG. 6. Once the crotch belt 24 and connecting rod 30 are in the desired location, the fourth position for example, the caregiver stops applying forward force F2 and applies an upward force F3 to cause connecting rod to move into mating contact with fourth rod-receiving notch 54 and be retained in the fourth position as shown in FIG. 7.

Child restraint 10 may be configured to restrain children of various sizes. During reconfiguration of child restraint 10, the position of movable headrest 22 and crotch belt 24 may be adjusted. As an example, a child sits on juvenile seat 12 and the caregiver moves movable headrest 22 to position the child's head between first and second side wings 55, 56 included in movable headrest 22. As a result of adjusting movable headrest 22, first and second shoulder belts 31, 32 move therewith. During upward movement of movable headrest 22, a length of shoulder belts 31, 32 extending through and away from movable headrest 22 increases to accommodate larger children. During downward movement of movable headrest 22, the length of shoulder belts 31, 32 extending through and away from movable headrest 22 decreases to accommodate smaller children. Once the child's head is between side wings 55, 56 of movable headrest 22, the caregiver then moves crotch belt 24 to one of the first, second, third or fourth predetermined positions that coordinates with the vertical position of movable headrest 22.

As shown in FIGS. 1, 3, 10, and 11, child restraint 10 further includes coordinating means 70 for coordinating movement of crotch belt 24 with movement of movable headrest 22 to cause crotch belt 24 to be moved to a predetermined position in response to movement of movable headrest 22. Coordinated movement of movable headrest 22 and crotch belt 24 minimizes movement of an occupant sitting on juvenile seat 12 and restrained by child-restraint harness 14 in the active state during application of an external force to juvenile seat 12 and so that comfort of the occupant sitting on juvenile seat 12 and being restrained by child-restraint harness 14 is maximized.

Figure 10:
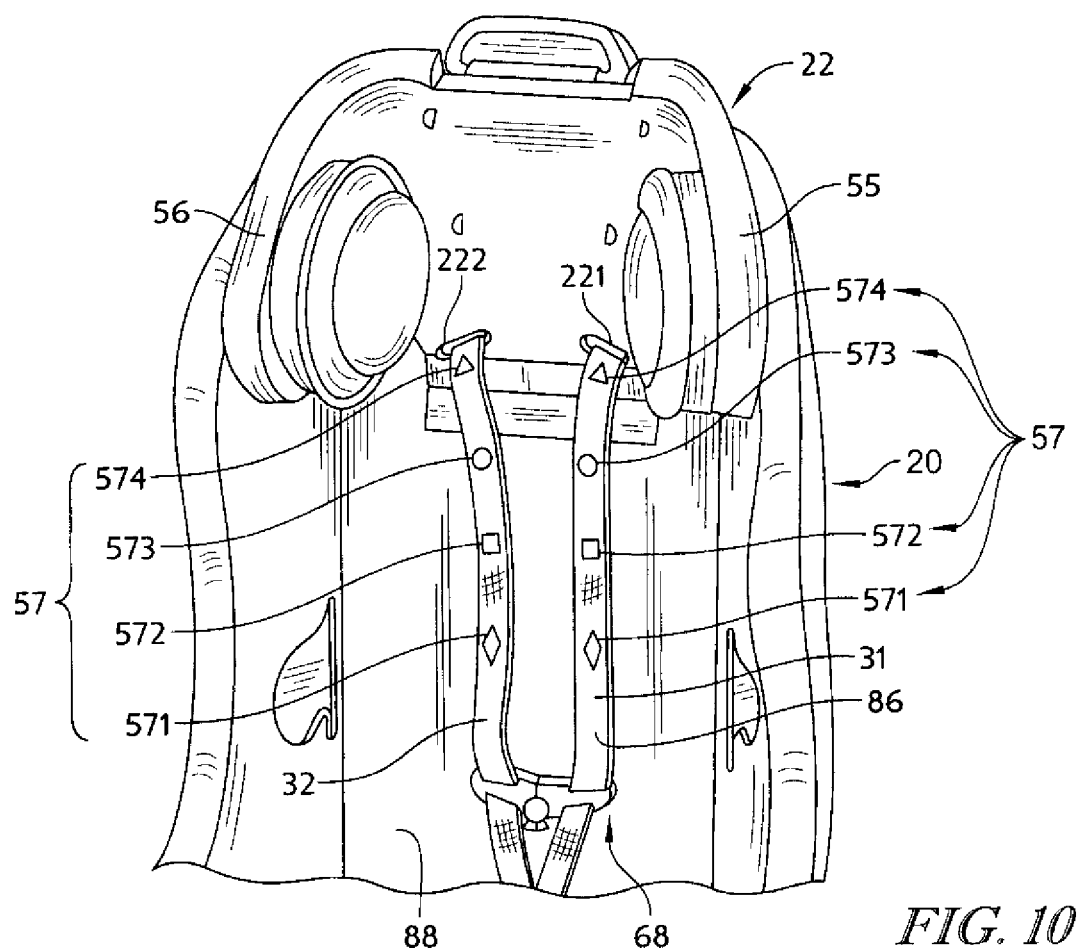
FIG. 10 is an enlarged partial perspective view of the child restraint of FIG. 1 showing that both shoulder belts included in the restraint harness include upper visual indicators that include, in order from front to back, a diamond-shaped symbol, a square-shaped symbol, a circle-shaped symbol, and a triangle-shaped symbol that cooperates with a lower visual indicator coupled to the crotch belt to communicate to a caregiver which position the crotch belt should be arranged in so that the upper and lower visual indicators match.
Figure 11:
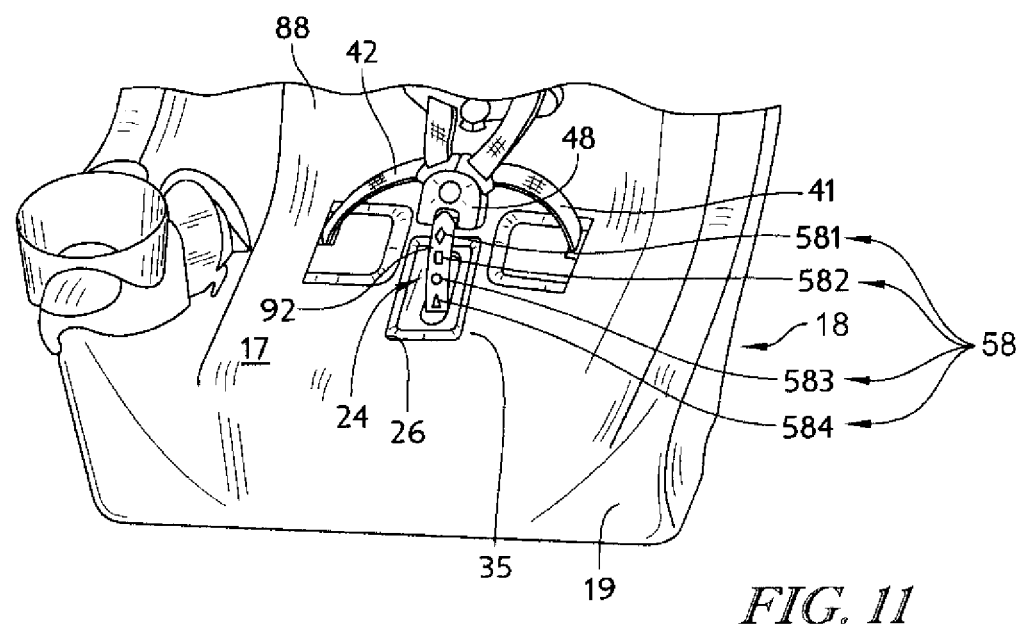
FIG. 11 is an enlarged partial perspective view of the child restraint of FIG. 1 showing that the lower visual indicator that includes, in order from top to bottom, a diamond-shaped symbol, a square-shaped symbol, a circle-shaped symbol, and a triangle-shaped symbol that cooperates with the upper visual indicator to communicate to the caregiver which position the crotch belt should be arranged in so that the upper and lower visual indicators match.

Coordinating means 70 includes an upper visual indicator 57 and a lower visual indicator 58. Upper visual indicator 57 is coupled to each shoulder belt 31, 32 to move therewith during movement of movable headrest 22 relative to seat bottom 18 as shown in FIG. 10. Lower visual indicator 58 is coupled to crotch belt 24 to move therewith as shown in FIG. 11.

Upper visual indicator 57 includes a first symbol 571 and a second symbol 572 coupled to an outer surface 86 of each shoulder belt 31, 32. Outer surface 86 of each shoulder belt 31, 32 is arranged to face away from movable headrest 22. Second symbol 572 is spaced apart from first symbol 571. First symbol 571 is positioned to lie in spaced-apart relation to front surface 88 of seat back 20 when movable headrest 22 is in the first headrest position. Second symbol 572 of upper visual indicator 57 is positioned to lie between first symbol 571 and front surface 88 of seat back 20 when movable headrest 22 is in the second headrest position.

Lower visual indicator 58 includes a first symbol 581 and a second symbol 582. Lower visual indicator 58 is coupled to an outer surface 92 of crotch belt 24 as shown in FIG. 11. Outer surface 92 is arranged to face away from seat back 20. First symbol 581 of lower visual indicator 58 is positioned to lie in spaced-apart relation above outer surface 35 of seat pan 17 when crotch belt 24 is in the first position. Second symbol 582 of lower visual indicator 58 is positioned to lie in spaced-apart relation above outer surface 35 of seat pan 17 and between first symbol 581 and outer surface 35 when crotch belt 24 is in the second position.

Upper visual indicator 57 further includes a third symbol 573 and a fourth symbol 574 as shown in FIG. 10. Third symbol 573 is spaced apart from front surface 88 when movable headrest 22 is in the third position. Fourth symbol 574 is spaced apart from front surface 88 when movable headrest 22 is in the fourth position. As an example, first symbol 571 has a diamond shape, second symbol 572 has a square shape, third symbol 573 has a circle shape, and fourth symbol 574 has a triangle shape, however, any other suitable shapes and colors may be used.

Lower visual indicator 58 further includes a third symbol 583 and a fourth symbol 584 as shown in FIG. 11. Third symbol 583 is spaced apart from outer surface 35 of seat pan 17 when crotch belt 24 is in the third position. Fourth symbol 584 is spaced apart from outer surface 35 when crotch belt 24 is in the fourth position. As an example, first symbol 581 has a diamond shape, second symbol 582 has a square shape, third symbol 583 has a circle shape, and fourth symbol 584 has a triangle shape, however, any other suitable shapes and colors may be used.

As an example of use, movable headrest 22 has been moved to the fourth headrest position as shown in FIG. 10 so that fourth symbol 574 (a triangle) of upper visual indicator 57 is visible to the caregiver. The caregiver now adjusts the position of crotch belt 24 so that fourth symbol 584 (a triangle) of lower visual indicator 58 is visible to the caregiver. Once the symbols on upper visual indicator 57 match the symbols on lower visual indicator 58, caregiver has positioned crotch belt 24 to cause minimized movement of the child restrained on juvenile seat 12 during application of an external force to juvenile seat 12 and to maximize comfort of the child restrained on juvenile seat 12.

Child-restraint harness 14, included in child restraint 10, includes, for example, first and second shoulder belts 31, 32, first and second thigh-restraint belts 41, 42 and crotch belt 24 as shown in FIGS. 1 and 3. Shoulder belts 31, 32 are arranged to pass through seat back 20 and over the upper torso of the child. Crotch belt 24 is arranged to extend upwardly through crotch-belt slot 26 formed in seat bottom 18 between thighs of the child. Each thigh-restraint belt 41, 42 is arranged to extend through seat bottom 18 over thighs of the child and toward crotch belt 24. As shown in FIGS. 1 and 3, first shoulder belt 31 and first thigh-restraint belt 41 are coupled together by a first connector 66. Second shoulder belt 32 and second thigh-restraint belt 42 are coupled together by a second connector 67. Crotch belt 24 is coupled to shoulder-belt retainer 48. Shoulder-belt retainer 48 is configured to selectively receive first and second connectors 66, 67 therein as shown in FIGS. 1 and 3.

Seat back 20 of juvenile seat 12 is formed to include first belt-travel channel 181 and second belt-travel channel 182 as shown, for example, in FIG. 1. Movable headrest 22 is mounted on seat back 20 to cause a first belt-receiving slot 221 formed in movable headrest 22 to be aligned with first belt-travel channel 181 and a second belt-receiving slot 222 formed in movable headrest 22 to be aligned with second belt-travel channel 182. As a result, first shoulder belt 31 extends through first belt-travel channel 181 and through first belt-receiving slot 221 and second shoulder belt 32 extends through second belt-travel channel 182 and through second belt-receiving slot 222.

Child-restraint harness 14 further includes a harness retainer 68 as suggested in FIGS. 1 and 3. As an example, first and second shoulder belts 31, 32 are arranged to extend from companion belt-receiving slots 221, 222 formed in movable headrest 22, through harness retainer 68, and into companion connectors 66, 67. Harness retainer 68 slides up and down relative to shoulder belts 31, 32 to maintain proper lateral spacing of shoulder belts 31, 32 relative to the child.

Crotch belt 24 is coupled to connecting rod 30 by loop 46 included in crotch belt 24. Loop 46 may be formed from taking the second end of web 44 and coupling it back to web 44. As another example, loop 46 may be a separate element coupled to the second end of web 44. Loop 46 is formed to include a connecting-bar passageway 50 and connecting rod 30 is positioned to lie in connecting-bar passageway 50. As a result, crotch belt 24 is coupled to connecting rod 30.

In another example of use, the caregiver is ready to put a child on juvenile seat 12 after child restraint 10 has been mounted to a vehicle seat in a vehicle. Once the child occupies the seat, the caregiver can now adjust a height of the movable headrest while simultaneously adjusting child-restraint harness to fit the child's overall size. This is achieved by using an interface that adjusts up and down. The user fits child-restraint harness over the child, fastens first and second connectors 66, 67 to shoulder-belt retainer 48, and adjusts harness retainer 68. Shoulder-belt retainer 48 is coupled to crotch belt by coupling to a web included in the crotch belt. The web may be routed through a semi-rigid flexible stalk also included in the crotch belt. The web and the semi-rigid flexible stalk extend downwardly through crotch-belt slot formed in a forward portion of seat bottom and coupling to connecting rod.

A color-coded icon (resembling the child's seating area and thighs) included on the crotch belt may be matched with a harness icon's color by adjusting the height of the crotch belt. The semi-rigid flexible stalk may make grasping and moving of the crotch belt easier.

To move the crotch belt, the belt retainer is decoupled from first and second connectors. Force is then applied to the belt retainer to cause the crotch belt to be pushed downwardly through the crotch-belt slot until the connecting rod is freed from the rod-receiving notch included in the controller foundation. The crotch belt may now be repositioned until the colors on the harness icons match the color of the crotch-belt icon thus achieving a predetermined recommended fit. The caregiver then removes the force and the crotch belt springs into a locked position in the rod-receiving notches formed in the controller foundation. Under the seat bottom, the crotch belt is anchored by a connecting rod that rests on a stepped controller foundation located beneath the seat bottom. This stepped controller foundation has increments of adjustment that raise the crotch belt through the seat bottom. The crotch belt is lengthened forward and up as the child grows in size and the crotch belt is shortened rearward and down for smaller sized children.

The invention claimed is:

1. A child restraint comprising
a juvenile seat including a seat bottom and a seat back extending upwardly from the seat bottom, the seat bottom including a seat pan having a rearward edge located near to the seat back and an opposite forward edge located away from the seat back and a seat skirt appended to the seat pan and arranged to cooperate with the seat pan to define a controller space located under the seat pan, the seat pan being formed to include a crotch-belt slot arranged to open into the controller space and to extend in a direction away from the rearward edge of the seat pan and the seat back and toward the opposite forward edge of the seat pan,
a child-restraint harness including a shoulder belt arranged to extend upwardly along a rear surface of the seat back, through a belt-travel channel formed in the seat back, a crotch belt arranged to extend upwardly through the crotch-belt slot, and a shoulder-belt retainer coupled to the crotch belt to move therewith, the shoulder-belt retainer being separated from the shoulder belt when the child-restraint harness is configured in an inactive state and coupled to the shoulder belt to interconnect the shoulder belt and the crotch belt when the child-restraint harness is configured in an active state, and
a crotch-belt controller located in the controller space under the seat pan and configured to provide position-variation means for allowing movement of the crotch belt in the crotch-belt slot toward and away from the seat back while the child-restraint harness is configured to assume the inactive state between a first position adapted for use with a small child and located a first distance from the seat back and located a first depth below the seat pan and a second position adapted for use by a larger child and located a larger second distance from the seat back and located a smaller second depth below the seat pan, which second depth is different from the first depth, and for anchoring the crotch belt in one of the first and the second positions at the option of a caregiver before the shoulder-belt retainer coupled to the crotch belt is coupled to the shoulder belt to establish the active state of the child-restraint harness so that spacing between the crotch belt and the seat back in the active state of the child-restraint harness is matched to the size of a child seated on the seat pan.

2. The child restraint of claim 1, wherein the crotch-belt controller includes a connecting rod coupled to the crotch belt to move therewith and a controller foundation formed to include a downwardly opening first rod-receiving notch, the connecting rod is positioned to lie in the downwardly opening first rod-receiving notch when the connecting rod is in the first position, the downwardly opening first rod-receiving notch is defined in part by a first inner side wall included in the controller foundation and the first inner side wall cooperates with a seat-back reference line associated with the seat back to define the first distance and a downwardly opening second rod-receiving notch, the connecting rod is positioned to lie in the downwardly opening second rod-receiving notch when the connecting rod is in the second position, the downwardly opening second rod-receiving notch is defined in part by a second inner side wall included in the controller foundation and the second inner side wall cooperates with the seat-back reference line to define the larger second distance.

3. The child restraint of claim 2, wherein the downwardly opening first rod-receiving notch is further defined by a first bottom wall that cooperates with a seat-pan reference line associated with the seat pan to define the first depth therebetween and the connecting rod touches the first bottom wall when the connecting rod is in the first position and the downwardly opening second rod-receiving notch is further defined by a second bottom wall that cooperates with the seat-pan reference line to define the smaller second depth therebetween and the connecting rod touches the second bottom wall when the connecting rod is in the second position.

4. The child restraint of claim 1, wherein the crotch-belt controller includes a connecting rod coupled to the crotch belt to move therewith and a controller foundation formed to include a downwardly opening first rod-receiving notch and a downwardly opening second rod-receiving notch spaced apart from the downwardly opening first rod-receiving notch, the downwardly opening first rod-receiving notch is defined by a first bottom wall that cooperates with a seat-pan reference line associated with the seat pan to define the first depth therebetween and the connecting rod touches the first bottom wall when the connecting rod is in the first position, and the downwardly opening second rod-receiving notch is further defined by a second bottom wall that cooperates with the seat-pan reference line to define the smaller second depth therebetween and the connecting rod touches the second bottom wall when the connecting rod is in the second position.

5. The child restraint of claim 4, wherein the controller foundation includes a first foundation flange appended to an inner surface of the seat pan arranged to face away from the seat back and a second foundation flange appended to the inner surface of the seat pan and positioned to lie in spaced-apart relation to the first foundation flange to locate the crotch-belt slot therebetween.

6. The child restraint of claim 5, wherein the first and the downwardly opening second rod-receiving notches cooperate to define a retention-notch reference line and an acute angle is defined between the retention-notch reference line and the seat-pan reference line.

7. The child restraint of claim 6, wherein the acute angle is about 30 degrees.

8. The child restraint of claim 5, wherein the first foundation flange has a trapezoidal shape defined by a first leg coupled to the inner surface of the seat pan, a first base intersecting the first leg to define about a right angle therebetween to cause the first base to extend away from the inner surface of the seat pan, a second leg intersecting the first base to define an included acute angle therebetween, and a second base arranged to interconnect the first and the second legs.

9. The child restraint of claim 8, wherein the included acute angle is about 60 degrees.

10. The child restraint of claim 4, wherein the first and the downwardly opening second rod-receiving notches cooperate to define a retention-notch reference line and an acute angle is defined between the retention-notch reference line and the seat-pan reference line.

11. The child restraint of claim 10, wherein the acute angle is about 30 degrees.

12. A child restraint comprising
a juvenile seat including a seat bottom and a seat back extending upwardly from the seat bottom, the seat bottom formed to include a crotch-belt slot arranged to open into a controller space formed in the seat bottom,
a child-restraint harness including a shoulder belt arranged to extend upwardly along a rear surface of the seat back, through a belt-travel channel formed in the seat back, a crotch belt arranged to extend upwardly through the crotch-belt slot, and a shoulder-belt retainer coupled to the crotch belt to move therewith, and
a child-restraint harness including a shoulder belt arranged to extend upwardly along a rear surface of the seat back, through a belt-travel channel formed in the back seat, a crotch belt arranged to extend upwardly through the crotch-belt slot, and a shoulder-belt retainer coupled to the crotch belt to move therewith, and
a crotch-belt controller including a controller foundation coupled to the seat bottom and positioned to lie in the controller space and a connecting rod coupled to the crotch belt in the controller space to move therewith during movement of the crotch belt in the crotch-belt slot toward and away from the seat back between a first position in which the shoulder-belt retainer is located a first retainer distance from the seat bottom and a second position in which the shoulder-belt retainer is located a larger second retainer distance from the seat bottom, the second retainer distance being different from the first retainer distance.

13. The child restraint of claim 12, wherein the crotch belt when in the first position is located a first belt distance from the seat back and when in the second position is located a larger second belt distance from the seat back.

14. The child restraint of claim 13, wherein the controller foundation is formed to include a downwardly opening first rod-receiving notch, the connecting rod is positioned to lie in the downwardly opening first rod-receiving notch when the connecting rod is in the first position, and a downwardly opening second rod-receiving notch, the connecting rod is positioned to lie in the downwardly opening second rod-receiving notch when the connecting rod is in the second position.

15. The child restraint of claim 14, wherein the downwardly opening first rod-receiving notch is defined in part by a first inner side wall included in the controller foundation and the first inner side wall cooperates with a seat-back reference line associated with the seat back to define the first belt distance and the first retainer distance and the downwardly opening second rod-receiving notch is defined in part by a second inner side wall included in the controller foundation and the second inner side wall cooperates with the seat-back reference line to define the larger second belt distance and the larger second retainer distance.

16. The child restraint of claim 12, wherein the controller foundation is formed to include a downwardly opening first rod-receiving notch and a downwardly opening second rod-receiving notch spaced apart from the downwardly opening first rod-receiving notch, the connecting rod is positioned to lie in the downwardly opening first rod-receiving notch when the connecting rod is in the first position, the connecting rod is positioned to lie in the downwardly opening second rod-receiving notch when the connecting rod is in the second position, and the first and the downwardly opening second rod-receiving notches cooperate to define a retention-notch reference line and an acute angle is defined between the retention-notch reference line and a seat-bottom reference line associated with the seat bottom.

17. The child restraint of claim 16, wherein the acute angle is about 30 degrees.

18. A child restraint comprising
a juvenile seat including a seat bottom, a seat back arranged to extend upwardly away from the seat bottom, and a movable headrest mounted for up-and-down movement on the seat back relative to the seat bottom between a first headrest position in which the movable headrest is positioned to lie a first height above the seat bottom and a second headrest position in which the movable headrest is positioned to lie a greater second height above the seat bottom, the seat bottom being formed to include a crotch-belt slot arranged to open into a controller space formed in the seat bottom,
a child-restraint harness including a shoulder belt arranged to extend upwardly along a rear surface of the seat back, through a belt-travel channel formed in the seat back, and through a belt-receiving aperture formed in the movable headrest, a crotch belt arranged to extend upwardly through the crotch-belt slot, and a shoulder-belt retainer coupled to the crotch belt to move therewith, and
a crotch-belt controller including a controller foundation coupled to the seat bottom and positioned to lie in the controller space and a connecting rod coupled to the crotch belt in the controller space to move therewith between a first position in which the crotch belt is located a first belt distance from the seat back and a second position in which the crotch belt is located a larger second belt distance from the seat back, and
means for coordinating movement of the crotch belt with movement of the movable headrest to cause the crotch belt to be moved to one of the first and second positions in response to movement of the movable headrest to one of the first and second headrest positions so that movement of an occupant sitting on the juvenile seat and restrained by the child-restraint harness is minimized during application of an external force to the juvenile seat and so that comfort of the occupant sitting on the juvenile seat and being restrained by the child-restraint harness is maximized.

19. The child restraint of claim 18, wherein the means for coordinating movement includes an upper visual indicator coupled to the shoulder belt to move therewith during movement of the movable headrest relative to the seat bottom and a lower visual indicator coupled to the crotch belt to move therewith and the upper visual indicator includes a first symbol coupled to an outer surface of the shoulder belt arranged to face away from the movable headrest and a second symbol coupled to the outer surface of the shoulder belt in spaced-apart relation to the first symbol and the first symbol is positioned to lie in spaced-apart relation to a front surface of the seat back when the movable headrest is in the first headrest position in which the movable headrest is positioned to lie the first height above the seat bottom.

20. The child restraint of claim 19, wherein the lower visual indicator includes a first symbol coupled to an outer surface of the crotch belt and is arranged to face away from the seat back and a second symbol coupled to the outer surface of the crotch belt and the first symbol of the lower visual indicator is positioned to lie in spaced-apart relation above the outer surface of the seat bottom when the crotch belt is in the first position.

* * * * *